March 6, 1951     R. H. PETERSON     2,544,040
PRESSURE REGULATOR

Filed Aug. 2, 1943     5 Sheets—Sheet 1

INVENTOR
ROBERT H. PETERSON
BY Cecil F. Arens
ATTORNEY

INVENTOR
ROBERT H. PETERSON
BY Cecil F. Avens
ATTORNEY

INVENTOR
ROBERT H. PETERSON
BY
Cecil F. Arens
ATTORNEY

March 6, 1951 R. H. PETERSON 2,544,040
PRESSURE REGULATOR
Filed Aug. 2, 1943 5 Sheets-Sheet 5
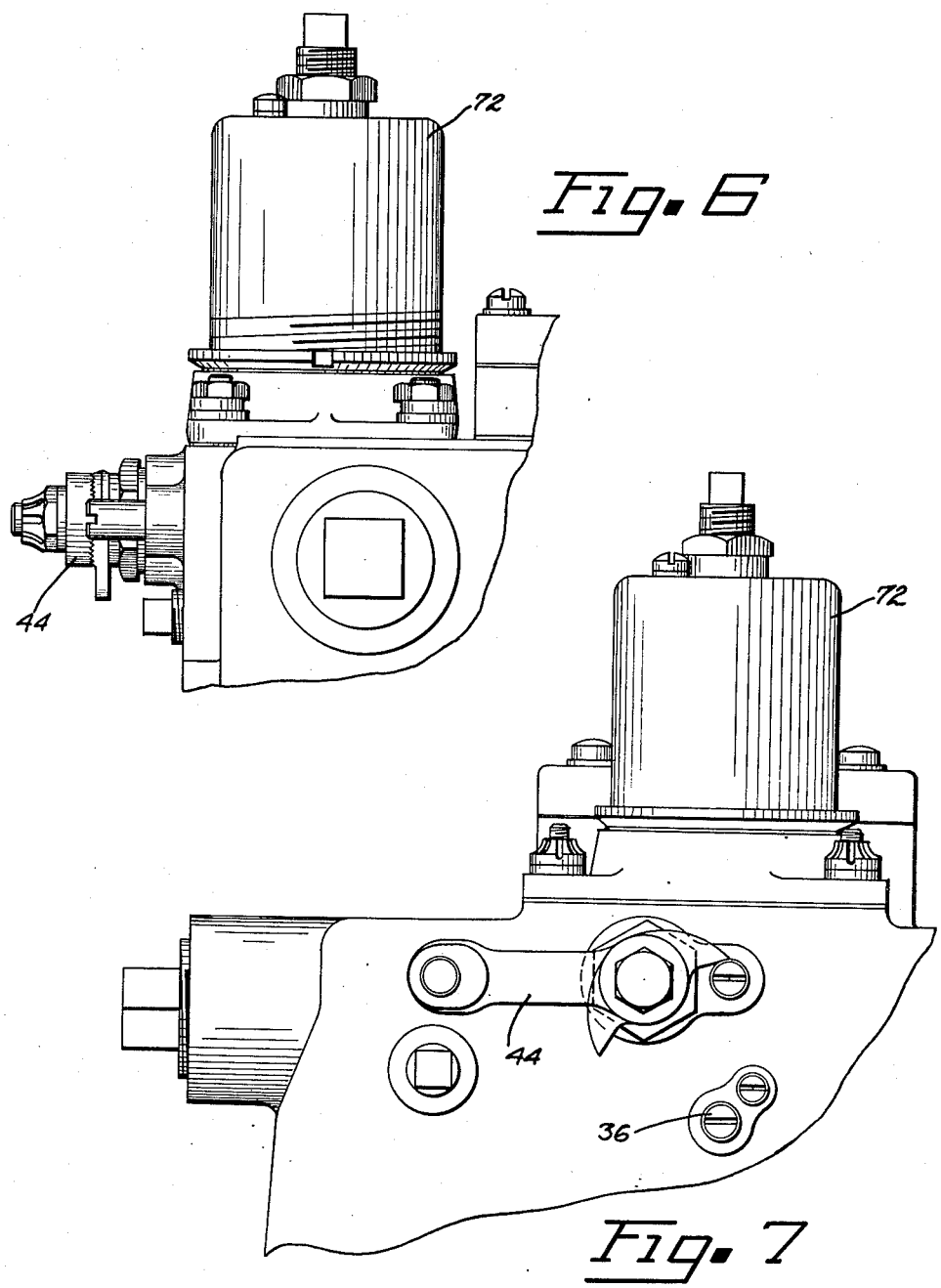
INVENTOR
ROBERT H. PETERSON
BY
Cecil F. Arens
ATTORNEY Patented Mar. 6, 1951

2,544,040

UNITED STATES PATENT OFFICE 2,544,040

PRESSURE REGULATOR

Robert H. Peterson, South Bend, Ind., assignor to Bendix Aviation Corporation, South Bend, Ind., a corporation of Delaware Application August 2, 1943, Serial No. 497,003

12 Claims. (Cl. 137—153)

This invention relates to pressure regulators, and more particularly to that type of regulator adapted for use in a fuel system for aircraft. The device of the present invention is an improvement over the device disclosed in my application Serial No. 468,769, now Patent No. 2,417,314, March 11, 1947, filed December 12, 1942.

The common method of supplying pressure to fuel tanks is to connect the tank to a manifold of a supercharged engine or to an inert gas source. The application of pressure to fuel tanks in excess of atmosphere to prevent or minimize the vaporization or boiling of the fuel presents various problems, one of which is the need of exact pressure control at all altitudes where auxiliary pressure is demanded, and release of this pressure when at altitudes where atmospheric pressure is adequate.

It is very desirable to reduce the fuel tank pressure to atmosphere pressure when an aircraft has descended below a certain altitude to minimize the possibility of bursting the tank or of spraying gas on inflammable objects when a fuel tank has been punctured.

Inert gases such as carbon dioxide or nitrogen are generally used as the pressure fluid in a fuel tank pressure system to lessen the hazard incidental to maintaining this highly combustible fuel under pressure. In this type of fuel pressure system it is necessary to provide pressure control means that will operate with a high degree of efficiency with a minimum loss of gas.

One of the important objects of the device of this invention lies in the provision of an improved pressure regulator for fuel tank systems which is responsive to pressure supplied by an inert gas.

Another object of the invention lies in the provision of a pressure regulator for fuel tank systems which is responsive to pressure supplied by the manifold of a supercharged engine.

A further object of the invention is to provide a pressure regulator which is subject to operation upon slight changes in atmospheric pressure.

A still further object of the invention resides in the provision of a pressure regulator which can be made to automatically respond to admit pressure to the fuel tank if a predetermined altitude is exceeded and to regulate the pressure in the tank so as to maintain a constant gage pressure, that is a constant amount of pressure over and above the prevailing atmospheric pressure, at all altitudes above said predetermined altitude.

Another object of the invention resides in the provision of a pressure regulator which will automatically admit pressure to the fuel tank at a predetermined altitude.

Another object lies in the provision of a pressure regulator that insures at all times a pressure on the fuel in the tank of at least atmospheric.

Another object lies in the provision of a pressure regulator that insures the fuel tank pressure will not exceed a predetermined value over and above atmospheric pressure regardless of the altitude.

Another object is the provision of a pressure regulator that utilizes pressure differentials for closing a valve against atmosphere and operates independently of the valve controlling the auxiliary pressure to the fuel tank.

Further details of my invention, the mode of operation thereof, and the operating advantages thereof are hereinafter more fully described with reference to the accompanying drawings in which:

Figure 6 is an elevational view of a portion of a regulator valve showing the bellows housing and the opening to the fuel tank.

Figure 7 is an elevational view showing a portion of the regulator valve and the operator's control lever.

As shown in the drawings:

Figure 1:
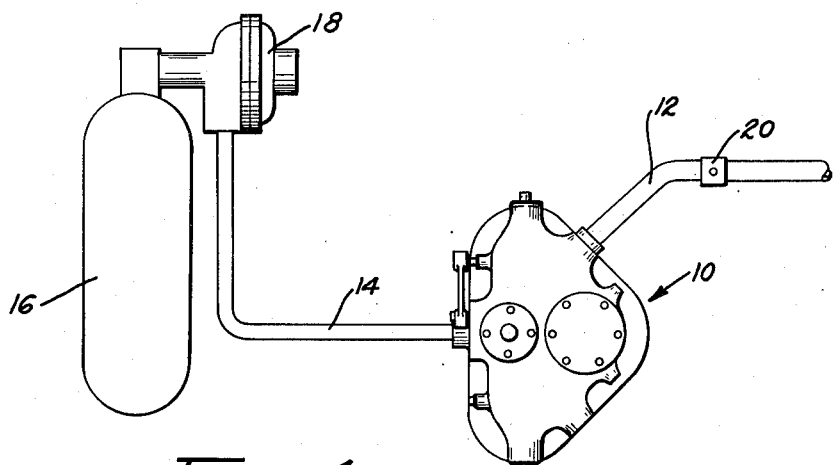
Figure 1 is a diagrammatic representation showing the connections from a pressure regulator of the type embraced in this invention to a carbon dioxide or other inert gas source.

Referring to Figure 1 the reference numeral 10 indicates a pressure regulator unit of a fuel pressure system wherein a conduit 12 connects the pressure regulator with a fuel tank, not shown, and a conduit 14 connects the regulator with a source of pressure supply which in this case is a carbon dioxide or other inert gas tank 16. Inasmuch as the pressure at the source might exceed the desired pressure by several times, a reducing valve 18 preferably is inserted in the system between the pressure source and the pressure regulator unit 10. A check valve 20 may be connected in the system between the pressure regulator and the fuel tank to preclude the flow of fluid from the fuel tank to the regulator.

Figure 2:
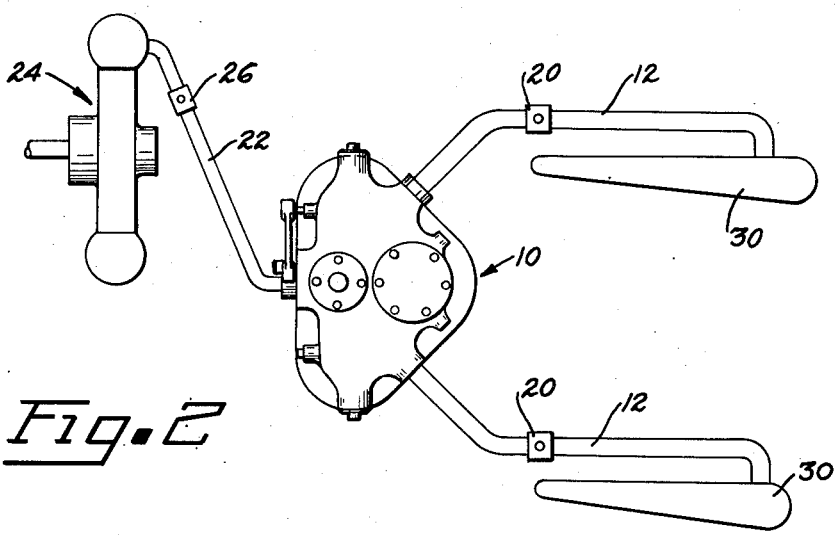
Figure 2 is a diagrammatic representation showing the connections from a pressure regulator to the manifold of a supercharged engine.

In Figure 2, pressure regulator 10 is shown incorporated into a fuel pressure system in which the source of pressure is the manifold of a supercharged engine. A conduit 22 connects the regulator to a supercharger 24 through a check valve 26 to prevent the possibility of a vacuum being applied to the regulator 10 at such times as the supercharger pressure is less than atmospheric pressure. The conduits 12 connect the pressure regulator to fuel supply tanks 30, preferably through check valves 20 to remove the possibility of fluid flowing from the tank to the regulator, in the same manner as in Figure 1.

Figure 3:
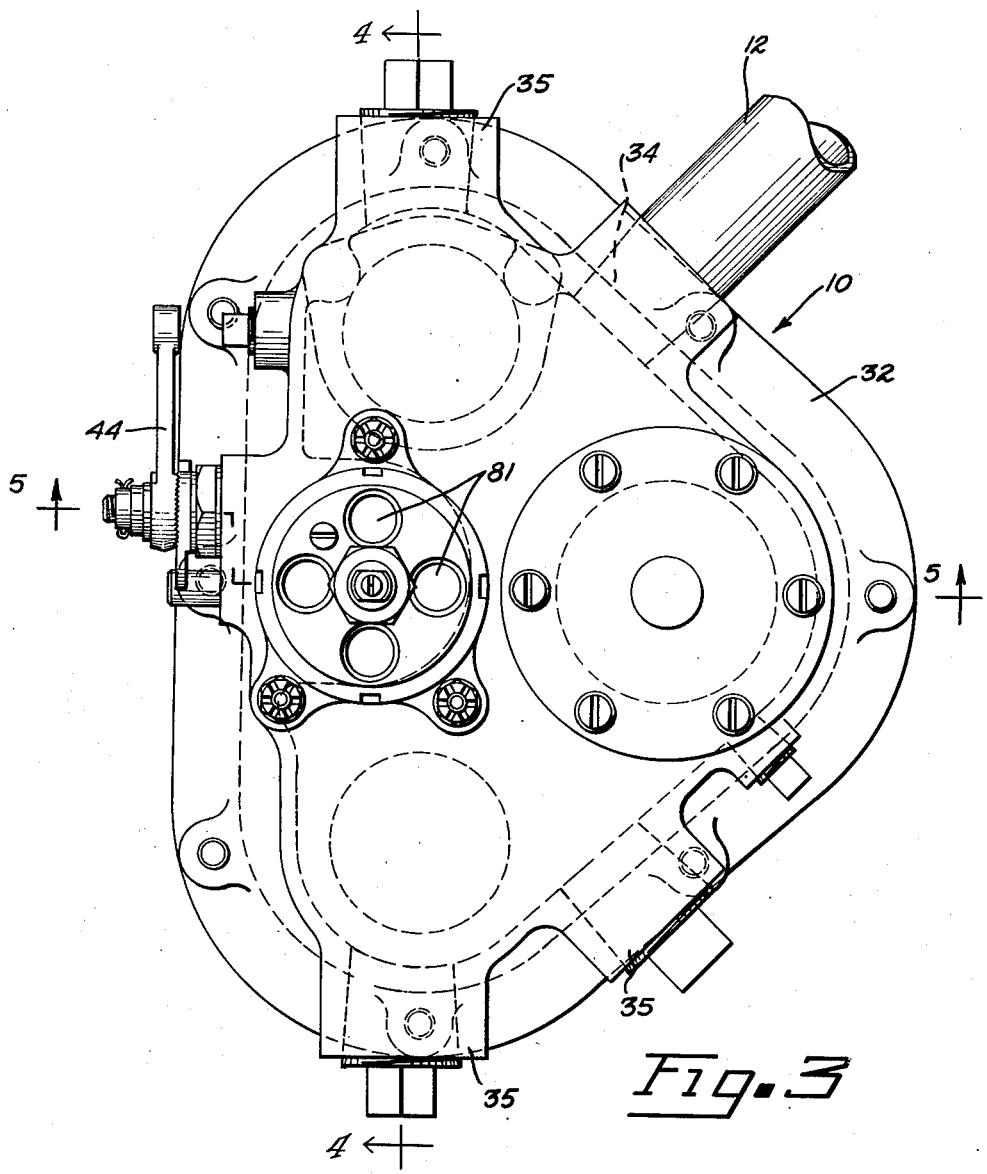
Figure 3 is a top plan view of the pressure regulator of this invention.
Figure 4:
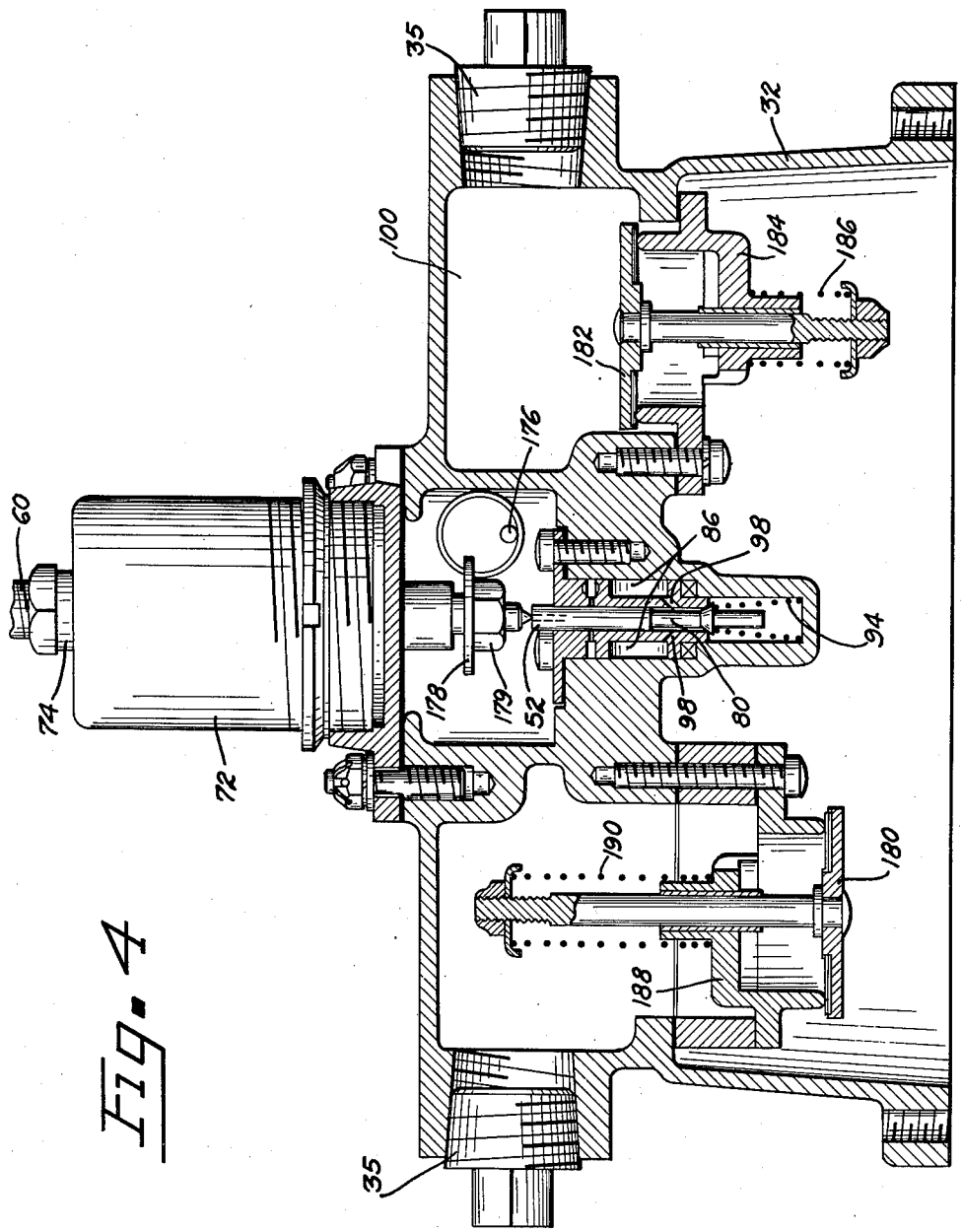
Figure 4 is a sectional view taken on the line 4—4 of Figure 3.
Figure 5:
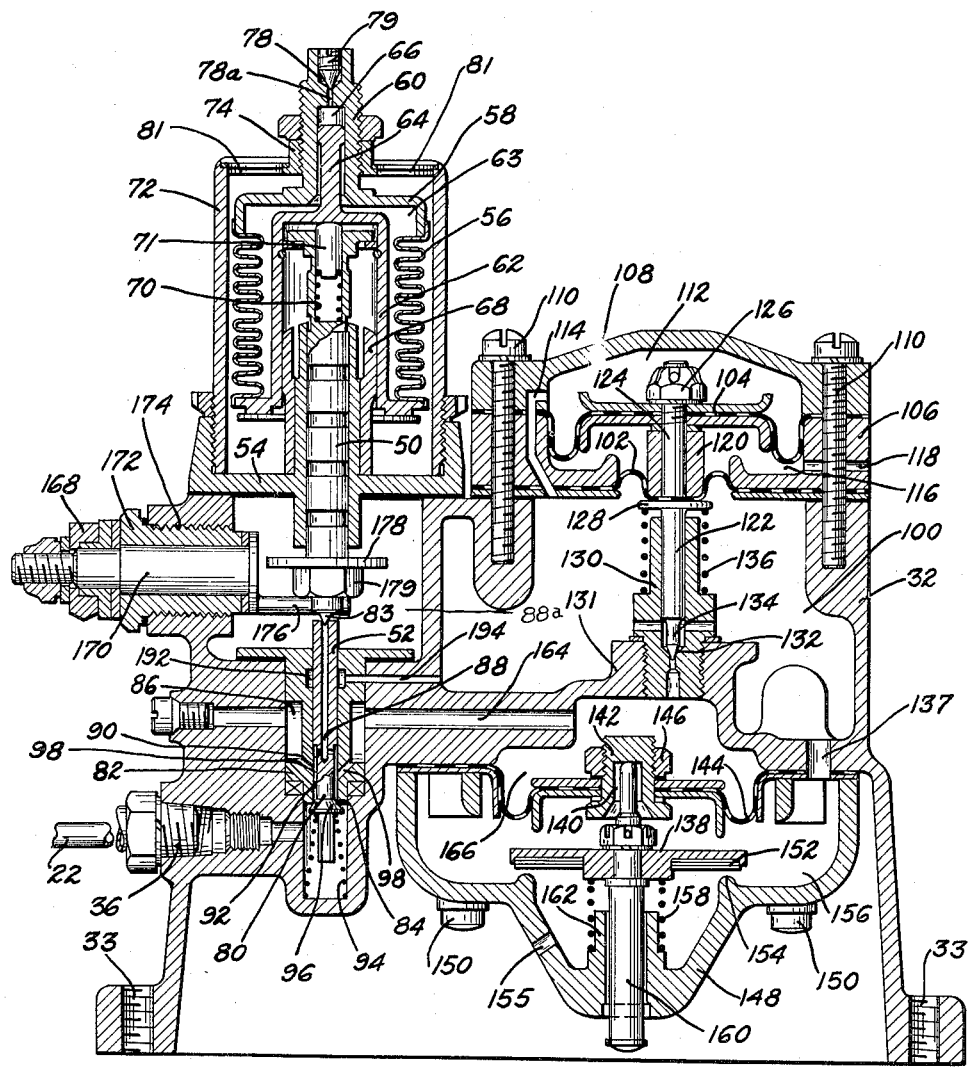
Figure 5 is a sectional view taken on the line 5—5 of Figure 3.

The pressure regulator 10 is shown in Figures 3 to 5 and comprises a main body portion 32 having threaded attaching flanges 33 for attachment of the regulator to any convenient support. An outlet 34 in the body is connected by the pipe 12 to a fuel tank, not shown. Other plugged outlets 35 are provided for connection to other tanks when a plurality of tanks are used. An opening 36 (Figure 5) is also contained in the housing 32 for receiving the conduits 14 or 22 from the main pressure source depending on whether connections are made with the supercharger or the inert gas supply.

For controlling the admission of fluid pressure to the regulator a condition responsive device, operated in this case by pressure, is utilized and comprises a pin 50, slidably fitted into a housing 54 and actuated by the expansion of a bellows 56, one end of which is secured to an expanded portion 58 of a bushing 60, and the other end of which is attached to an inverted cup 62, to thereby form a sealed expansible chamber 63. The inverted cup 62 is guided in its travel, at the top, by a stem portion 64, which is an integral part of cup 62 and which slidably fits into a recess portion 66 of the bushing 60, and at the bottom by the sleeve 68. A loading spring 70 is intercalated between the pin 50 and a pin 71 in abutting relation with the inverted cup 62 to allow for angular displacement of said cup with relation to the pin 50. The bushing 60 threadedly engages hub portion 74 of a bellows housing 72 threaded at its lower portion to engage the housing 54 which is secured to the main housing 32 in any suitable manner such as bolting thereto.

The chamber 63, formed by the bellows 56 and the inverted cup 62, communicates with a threaded counterbore or opening 78 in the bushing 60, through a passage 78a. The internal pressure condition within chamber 63 is initially regulated at opening 78 to control the expansion vs. altitude characteristics of chamber 63, and the chamber then sealed by a plug 79 adapted to threadedly engage opening 78. Openings 81 in the top of the bellows 72 permit the exterior of the bellows 56 to be subjected to atmospheric pressure at all times.

For controlling the fluid pressure from its source to the pressure regulator a valve member 80 is provided which is adapted to be engaged by a valve tip 83 on the pin 50, and is slidably associated with a bushing 82 which bushing is provided with a valve seat 84 and an annulus 86. The valve member 80 has a longitudinal restricted passage 88 which is closed at its upper end by the valve tip 83 when the bellows 56 has expanded to open valve 80 and is open to chamber 88a at its upper end when the bellows is collapsed and valve 80 is closed, said latter chamber being vented to the atmosphere due to the unsealed mounting of pin 50 and shaft 170, to be described. The passage 88 terminates at its lower end in the transverse passage 90 of said valve. Valve 80 has a reduced portion 92 which permits fluid from the source to pass between said valve and bushing 82 when the valve has been moved from the seat 84 against a conical spring 94. The conical spring has its lower end abutting the casing 32 and its upper end abutting a tapered portion 96 of the valve 80. The tapered portion 96 provides a seating surface adapted to cooperate with the seat 84 of the bushing 82. Passages 98 of bushing 82 communicate the annulus 86 with the source of fluid pressure when valve 80 is open.

To provide a common terminus for all fuel tank connections a main pressure chamber 100 is formed by the housing 32 and a flexible wall or diaphragm 102. The diaphragm 102 and a large diaphragm 104 are secured at their peripheries by a cover ring 106 and cover 108 drilled for the reception of bolts 110 which threadedly engage the casing 32. A chamber 112, which is formed by the diaphragm 104 and cover 108, communicates with the main chamber 100 through a passage 114. The cover ring 106 and diaphragms 102 and 104 embrace a chamber 116 having a vent 118 to atmosphere. A spacer washer 120 maintains the diaphragms 102 and 104 in spaced relationship.

In order to maintain the desired pressure in chamber 100 and fuel tanks 30 a spring biased valve 122, which is actuated by pressure differential across diaphragms 102 and 104, is provided. The valve 122 has an extended portion 124 which is connected to the diaphragms 102 and 104 and is held in fixed relationship to said diaphragms by the nut 126 and flange 128. A valve bushing 130, threadedly engages the partition 131 of the casing 32 and has a seat 132 adapted to cooperate with the valve pin 134 of the valve 122. A spring 136 normally urges valve pin 134 off the seat 132 of bushing 130.

To enable the main chamber 100 and the fuel tanks 30 to communicate with atmosphere, through a passage 137 in partition 131, at predetermined altitudes and to disconnect said chamber and tanks from atmosphere at the proper time, a valve 138 is provided. Valve 138 is reduced at its top to engage a counterbore 140 of a bushing 142 which is secured to a diaphragm or movable wall 144 by a lock nut 146. The movable wall 144 is held in its position, between housing 32 and a casing 148, by studs 150 which pass through the casing and engage housing 32. Valve 138 has a disk portion 152 secured thereto and is adapted to cooperate with the annular rib 154 of the casing 148 to thereby provide a sealing means for cutting off the connection between atmosphere and chamber 100 through a passage 155, chamber 156, and passage 137. A spring 158 normally urges the valve 138, which is guided in its travel by a shank portion 160 cooperating with a hub portion 162 of casing 148, off its seat to admit atmospheric pressure to chamber 100 at low altitudes.

To insure that valve 138 will be closed to atmosphere when valve 80 is open to admit auxiliary pressure to chamber 100, a passage 164, in the partition 131, connects a chamber 166, formed by the partition 131 and the movable wall 144, to the annulus 86, which annulus is connected to the pressure source. The admission of fluid under pressure to chamber 166 and above diaphragm 144 moves the diaphragm downwardly to actuate the valve 138 which closes chamber 100 to atmosphere.

Should the operator wish to disassociate the fuel tanks from their auxiliary pressure source or should he wish to render the regulator inoperative for any reason, a lever 168 is provided for manual control. The lever 168 is associated with a shaft 170 which turns in an exteriorly threaded bushing 172 adapted to fit into the threaded opening 174 of the casing 32. On the opposite end of the shaft 170 from the lever 168 is an element 176 suited to engage a flanged portion 178 of a nut 179 threadedly secured to pin 50, to raise the pin 50 out of operational contact with the valve stem 52 of the valve 80 when the lever 168 is rotated, thereby allowing valve 80 to be closed by the spring 94.

It is necessary to provide a safety means in chamber 100 to insure that the pressure in this chamber is never at any time substantially less than atmospheric pressure or greater than a predetermined value above atmospheric pressure. To obtain this protection inlet and outlet safety relief valves 180 and 182 are disposed in chamber 100. Inlet valve 182 is slidably associated with a valve bracket 184 which is secured to the housing 32. The valve is spring biased to closed position by a relatively light spring 186 which abuts the valve bracket 184 at one of its ends and is associated with the valve 182 at its other end. This construction will permit the valve to open should the pressure in chamber 100 drop to subatmospheric pressure.

Outlet valve 180 is similarly constructed to valve 182 except that valve 180 is reversed to insure that the pressure in chamber 100 does not exceed atmospheric pressure by more than a predetermined amount. Valve 180 is slidably associated with the valve bracket 188 which is fastened to the valve housing 32. A spring 190 cooperates with the valve 180 and abuts the valve bracket 188 to thereby urge the valve to closed position under normal conditions. Should the pressure in chamber 100 exceed a predetermined value above atmospheric pressure, valve 180 will open against spring 190 to relieve the excess of pressure.

Where inert gases are used it is very desirable to reduce the gas leakage to a minimum and to maintain as much of the gas as is practical within the confines of the system. To attain this end a circumferential recess 192 is provided to catch high pressure fluid which might escape between the bushing 82 and the valve stem 52 of valve 80, and to pass the fluid into chamber 100 through a passage 194 of the housing 32.

Actuation of valve 138 depends on the pressure in chamber 166, and when the valve is to move from closed to open position the pressure in chamber 166 must be released to allow the spring 158 to urge valve 138 off its seat. To release the pressure in chamber 166 substantially simultaneously with a closing of valve 80, a communication is provided between atmosphere and chamber 166 comprising passages 88 and 90, provided in the valve stem 52, and passages 98, and 164. This atmospheric connection is closed by valve tip 83 whenever the valve 80 is opened by the downward movement of stem 50, and is open to permit escape of pressure fluid from chamber 166 whenever valve 80 closes upon upward movement of stem 50 and its valve tip 83.

At low altitudes where auxiliary pressure is not needed the relatively high atmospheric pressure collapses bellows 56 and raises stem 50 whereby the valve 80 is closed to the pressure source. At this time the valve 138 is open under the influence of spring 158, to permit atmospheric pressure to obtain in chamber 100 and fuel tanks 30; and valve 122 is maintained in open position by spring 136 since chambers 100, 112, and 116 are all subjected to atmospheric pressure.

As the aircraft ascends from sea level the position of the parts will remain the same until a predetermined altitude is reached where auxiliary pressure on the fuel tanks is desirable. At this time the bellows 56 has expanded by reason of the reduced atmospheric pressure, and forced pin 50 downwardly to close passage 88 and move valve 80 off its seat allowing fluid under pressure to enter chamber 166 through passage 164. Since the area of the escape port defined by valve seat 132 is less than that of the inlet port defined by seat 84 of valve 80 and passage 164, pressure will immediately build up in chamber 166. As the pressure builds up in chamber 166 it forces diaphragm 144 downwardly and closes valve 138 to atmosphere. Pressure fluid supplied to chamber 166 enters chamber 100 past the open valve 122 and raises the pressure in chambers 100 and 112, and in the fuel tanks, until the pressure in chamber 112 acting downwardly on the relatively large diaphragm 104 is sufficiently greater than atmospheric pressure to overcome spring 136 and close valve 122. It should be noted that the resultant of the pressure differential, between the pressure on the tanks and atmosphere, acting downwardly on the large diaphragm minus the same pressure differential acting upwardly on the smaller diaphragm acts against spring 136 to urge the valve downwardly. As fuel is used from the fuel tanks the valve 122 will open and close to admit sufficient pressure fluid to chamber 100 to maintain the pressure in said chamber and in fuel tanks 30 at a value greater than atmospheric by a constant increment determined by the strength of spring 136, that is, the gage pressure in the tanks will be maintained at a constant value.

If the altitude were now suddenly increased, as by a rapid climb, the atmospheric pressure would rapidly decrease whereas the pressure in the tanks and in chamber 100 would remain constant, except for a slight decrease resulting from the accompanying consumption of fuel. As a consequence the differential between the pressure in the tank and atmospheric pressure, or in other words the gage pressure in the tank, would increase above the normal regulated value, and might tend to burst the tanks. This possibility is avoided, however, by the outlet relief valve 182 which is set to open and relieve the pressure whenever the gage pressure in the tanks exceeds the normal regulated value by more than a predetermined amount.

When the aircraft descends, pressure fluid is admitted to chamber 100 to maintain the desired gage pressure until a predetermined altitude is reached, at which time the bellows contracts by reason of the increased atmospheric pressure and the valve tip 83 of pin 50 is moved out of contact with the valve stem 52 which permits the spring 94 to urge the valve 80 to closed position. The pressure which now obtains in chamber 166 is bled off through the now open restricted passages 88, 90 in valve 80 to atmosphere. This reduction in pressure above diaphragm 144 causes spring 158 to force valve 138 open to admit atmospheric pressure to chamber 100 and fuel tanks 30 for low altitudes.

I do not intend that the present invention shall be restricted to the specific structural details set forth, as various modifications may take place without departing from the spirit and scope of my invention. I desire, therefore, that only such limitations as are indicated in the appended claims be imposed.

I claim as my invention:

1. A pressure regulator for an aircraft fuel tank pressure control system comprising a main pressure chamber adapted to be connected to a fuel tank, a conduit for supplying pressure fluid to said chamber, a pair of valves in series relation in said conduit, means responsive to barometric pressure controlling the first of said valves, means responsive to the pressure in the chamber for controlling the second valve, an atmospheric vent for the chamber, and means responsive to the pressure in the conduit between the valves for controlling said vent.

2. The invention defined in claim 1 comprising in addition venting means for the conduit, said venting means being controlled by the barometric pressure responsive means.

3. A pressure regulator for an aircraft tank pressure control system including a pressure chamber having an outlet which is of a restricted area relatively to its inlet and fluid flow connections adapted to communicate with a fuel tank and a pressure source, a valve which when open communicates pressure from said source to said chamber, means responsive to changes in atmospheric pressure arranged to open said valve, means yieldingly urging said valve to closed position, another valve arranged to vent said chamber to the atmosphere when said first-named valve is closed, and means responsive to the pressure of the fluid passed by said first-named valve arranged to close said vent valve.

4. A pressure regulator as claimed in claim 3 having further valve means arranged to maintain a predetermined pressure condition in said chamber when fluid under pressure is admitted thereto from said source.

5. In a pressure regulator for an aircraft fuel tank pressure control system, a pressure chamber having fluid flow connections adapted to communicate with a fuel tank and a pressure source, a first valve controlling communication of pressure from said source to said chamber, means responsive to changes in atmospheric pressure arranged to actuate said valve to admit fluid under pressure from said source to said chamber, a second valve for regulating the pressure in said chamber, and means responsive to the differential between the pressure in said chamber and atmospheric pressure controlling said second valve.

6. In a pressure regulator for an aircraft fuel tank pressure control system, a pressure chamber having fluid flow connections adapted to communicate with a fuel tank and a pressure source, a first valve controlling communication of pressure from said source to said chamber, means biasing said valve to seated position, means for admitting atmospheric pressure to said chamber when said valve is closed, means responsive to changes in atmospheric pressure arranged to open said valve and admit fluid under pressure from said source to said chamber and means for substantially simultaneously closing off atmospheric pressure from said chamber, and a second valve arranged to maintain a predetermined pressure in said chamber when said first valve is open.

7. A pressure regulator for an aircraft tank pressure control system including a pressure chamber having fluid flow connections adapted to communicate with a fuel tank and a pressure source, a spring-pressed valve which when open communicates pressure from said source to said chamber, means responsive to changes in atmospheric pressure arranged to open said valve, another valve for controlling the pressure in said chamber, means responsive to the differential between the pressure in said chamber and atmospheric pressure for actuating said second-named valve, and a spring opposing said differential for maintaining the pressure in said chamber at a predetermined value above atmospheric pressure.

8. A pressure regulator for an aircraft tank pressure control system including a pressure chamber having fluid flow connections adapted to communicate with a fuel tank and a pressure source, a valve controlling communication of pressure from said source to said chamber, means responsive to changes in atmospheric pressure arranged to control said valve, a valve port through which fluid passed by said first valve flows to said chamber, a pressure-regulating valve controlling said port, diaphragm means connected to said latter valve and subjected to the differential between the pressure in said chamber and atmospheric pressure, and a spring opposing the differential and operating to maintain the pressure in said chamber at a predetermined value above atmospheric pressure.

9. A pressure regulator for an aircraft tank pressure control system including a pressure chamber having an outlet which is of restricted area relatively to its inlet and fluid flow passages adapted to connect the chamber to a fuel tank and to a pressure source, a first valve in the passage leading to the pressure source and means responsive to changes in atmospheric pressure controlling said valve, a second valve in said latter passage downstream of said first valve for regulating the pressure in said chamber and means responsive to the differential between chamber pressure and atmospheric pressure controlling said second valve, and a third valve controlling communication of atmospheric pressure to said chamber, said latter valve being resiliently maintained in open position while said first valve is closed and having means responsive to the pressure in the passage leading to the pressure source downstream of said first valve operating to close said third valve when the first valve opens.

10. A pressure regulator for an aircraft tank pressure control system, including a pressure chamber and fluid flow passages adapted to connect the chamber to a fuel tank and to a pressure source, a first valve in the passage leading to the pressure source spring-actuated toward closed position, means responsive to changes in atmospheric density coacting with said valve to maintain the latter in open position under predetermined atmospheric density conditions, a second valve mounted in said passage between said first valve and said chamber for regulating the pressure in the chamber, said second valve being biased toward open position and having diaphragm means connected thereto subjected to the differential between chamber pressure and atmospheric pressure acting in a valve-closing direction, and means for admitting atmospheric pressure to said chamber when said first valve is closed and for closing said chamber to atmosphere when said first valve is open.

11. In a pressure regulator for an aircraft fuel tank pressure control system, a pressure chamber arranged for fluid pressure communication with a fuel tank and a pressure source, a valve controlling communication of pressure from said source to said chamber, means responsive to changes in atmospheric pressure arranged to actuate said valve under predetermined atmospheric pressure conditions, means for maintaining a predetermined superatmospheric pressure condition in said chamber when said valve is positioned to communicate pressure from said source to said chamber, and safety valve means operative to maintain the pressure in said chamber within predetermined upper and lower limits, 12. A regulator as claimed in claim 11 wherein said safety valve means comprises a pair of reversely-disposed valves controlling inlet and exhaust ports in a wall of said chamber, said pair of valves being spring-biased toward closed position.

ROBERT H. PETERSON.

REFERENCES CITED

The following references are of record in the file of this patent:

UNITED STATES PATENTS

| Number | Name | Date |
|---|---|---|
| 219,178 | Schmidt | Sept. 2, 1879 |
| 632,808 | Dunlap | Sept. 12, 1899 |
| 1,398,315 | Cawthra | Nov. 29, 1921 |
| 1,471,417 | Rateau | Oct. 23, 1923 |
| 1,982,045 | Clithero | Nov. 27, 1934 |
| 2,270,659 | Meyn | Jan. 20, 1942 |
| 2,345,547 | Roth | Mar. 28, 1944 |